July 7, 1959
L. E. THOMPSON
2,894,129
TONE MULTIPLEX CIRCUIT WITH NARROW BANDWITH
CHANNEL-SEPARATING FILTERS
Filed Jan. 19, 1955
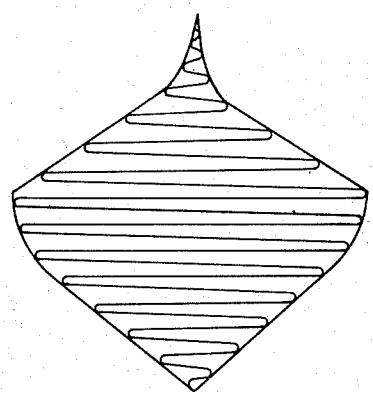
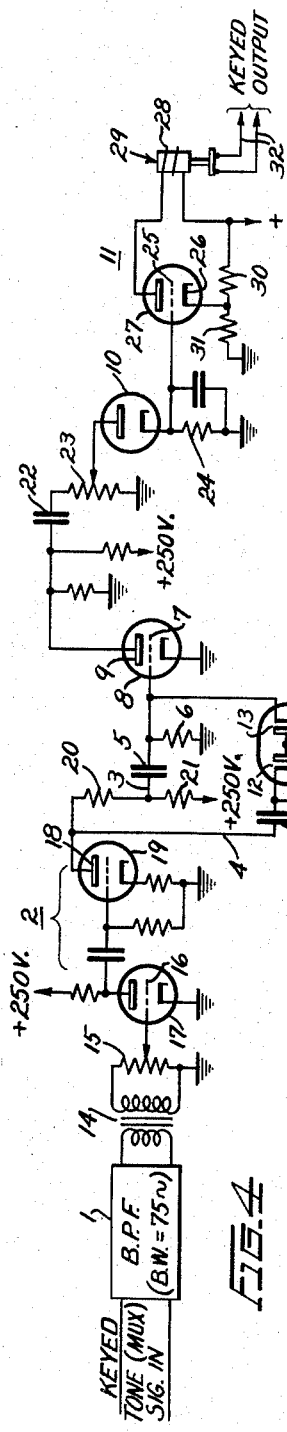
INVENTOR.
LELAND E. THOMPSON
BY
AGENT

2,894,129
TONE MULTIPLEX CIRCUIT WITH NARROW BANDWIDTH CHANNEL-SEPARATING FILTERS

Leland E. Thompson, Merchantville, N.J., assignor to Radio Corporation of America, a corporation of Delaware Application January 19, 1955, Serial No. 482,719

2 Claims. (Cl. 250—27)

This invention relates to a tone multiplex circuit and more particularly to a circuit useful in a receiving system for tone signals keyed by telegraph, telemetering, telephone dialing or other pulses.

In tone channel multiplex systems, multiplexing is accomplished by the use of a different tone frequency for each multiplex channel, the tone frequencies being either in the audible or supersonic range. Each tone produced by the tone transmitters can be keyed by input pulses from such equipment as teleprinter, telegraph, telemeter, telephone dialing, and the like. At the receiver, bandpass filters are used to separate the different multiplex channels from each other. In this way, frequency division multiplexing is accomplished. To reproduce the keying pulses with minimum distortion usually requires, for example, bandpass filters having bandwidths of 500 cycles for teleprinter operation at 60 words per minute. If the channel-separating bandpass filters have bandwidths of this order of magnitude, only a rather limited number of tone channels may be used in a given frequency spectrum.

An object of this invention is to provide a novel circuit arrangement for tone multiplex receivers.

Another object is to devise an arrangement for frequency division multiplex receivers, which enables channel bandpass filters of relatively very narrow bandwidths to be used, while at the same time keeping the signal distortion to a minimum.

A further object is to devise a circuit arrangement for frequency division multiplex receivers which will allow many more channels to be used in a given frequency spectrum, as compared to receivers of the prior art.

The objects of this invention are accomplished, briefly, in the following manner: In a keyed tone receiver, the incoming keyed tone pulses are applied to the input of a narrow bandpass filter having rise and decay times equal to each other and long as compared to the rise and fall times of the pulses. A resistance-capacitance circuit having a time-constant which is long compared to the decay time of the filter couples the output of the filter to the input of an amplifier, the capacitor of this circuit becoming charged to reduce the amplifier gain, thereby to cause such amplifier in effect to cut off at a time beyond the peak of the filter output pulse equal to the initial delay time (after the onset of the pulse) of effective conduction in the amplifier. A separate circuit is provided for discharging the capacitor of the long-time-constant circuit in the intervals between pulses.

The aforesaid and other objects of this invention will be better understood from the following description of an exemplification thereof, reference being had to the accompanying drawings, wherein:

Figs. 1 and 2 are curves and waveforms useful in explaining the invention;

Fig. 3 is a combined block and circuit diagram of an arrangement according to this invention; and Fig. 4 is a detailed circuit diagram of the arrangement of this invention.

This invention is concerned with a receiver useful in tone channel multiplex communication systems of the frequency division type. In transmitters for systems of this type, different tone frequencies (in the audible or supersonic range) for the different channels are separately keyed by input pulses from such equipment as teleprinter, telegraph, telemeter and telephone dialing. These input pulses are ordinarily rectangular or square wave D.C. pulses. Some bandpass filtering may be used in the transmitter channels, to reduce sidebands that might otherwise extend into other channels. As a result, the envelopes of the keyed tone output signals of the transmitter may not be rectangular and may not have infinitesimally short rise and fall times, although the rise and fall times are still rather short.

At the receiver, these keyed tone signals are applied in parallel to a group of bandpass filters which separate the different channels from each other. For some applications such as teleprinter, it is necessary to reproduce the transmitter square wave D.C. pulse envelopes with very small distortion. Hitherto, a rather wide bandwidth was required for each receiver bandpass filter, to provide a filter rise and decay time sufficiently short so that the reproduced D.C. pulse envelope at the filter output would have the same length as the transmitted pulse, within the allowable limits of ±5%. To give an example, filters of 500 cycles bandwidth were customarily required for teleprinter operation at 60 words per minute.

If the bandwidths of these filters were reduced in an attempt to use more tone channels in a given frequency spectrum, the filter rise and decay times would necessarily be lengthened, to such an extent that undue distortion in the length of the pulse envelope at the filter output would result. Referring to Fig. 1, the solid line curve A (square wave) represents the minimum pulse width and space width, equivalent to mark and space, of a teleprinter signal to be transmitted at a speed of 70 words per minute. Beginning at 0 on the time axis, the first 20 milliseconds (ms.) of curve A represents "mark" or "pulse," while the next 20 milliseconds of this curve represents "space." Curve A represents the shortest "mark" and the shortest "space" to be transmitted at a speed of 70 words per minute. These shortest elements determine the bandwidth needed; that is, if these shortest elements can be translated with the required minimum distortion, the longer ones can also be so transmitted.

If the signal A of Fig. 1 were used to key a tone and then, at the receiver or in the combination of receiver and transmitter, this keyed tone was passed through a receiving filter having a very narrow bandwith of only 75 cycles, the keyed tone envelope at the output of the filter would be as represented in Fig. 2. The rather slow rise and subsequent slow decay in the amplitude of the tone (illustrated in Fig. 2) are results of the rather long rise and decay times inherent in a filter having a bandwidth of only 75 c.p.s.

Referring again to Fig. 1, the curves B and C represent the Fig. 2 signal after detection, two different levels of signal being represented. Considering the higher signal level curve B, if the receiver output relay is adjusted to operate at the amplitude level of point D, the output pulse will be as represented by E—D—F—G, which is longer than the "mark" portion of curve A, producing distortion. Considering the lower signal level curve C, the output pulse will be as represented by H—K—L—J, which is again longer than the "mark" portion of curve A, again producing distortion. Moreover, the two output pulses E—D—F—G and H—K—L—J are considerably different in length from each other, as a result of different levels of the receiver input signal. For such a receiver, very little, if any, level change can be tolerated if it is desired to provide a constant length output pulse.

The aforementioned difficulties (difference in length of the reproduced pulse, as compared to the input pulse, and sensitivity to the level of the receiver input signal) can be overcome by using a much wider bandwidth for the bandpass filter, so that the rise and decay times of the tone envelope at the bandpass filter output would be much shorter. The present invention overcomes these difficulties without increasing the bandpass filter bandwidth, thus allowing many more tone channels to be used in a given frequency spectrum.

Referring to Fig. 3 which is a diagrammatic representation of an arrangement according to this invention, in a receiver the keyed tone (multiplex) signal is applied to the input of a very narrow bandpass filter 1, having a bandwidth of approximately 75 cycles, for example. The output of filter 1 (which may be represented in Fig. 2, for example) is applied to the input of an amplifier 2 having two output connections 3 and 4 of different amplitude levels, the level in connection 4 being for example greater by 12 db than the level in connection 3, as indicated.

The signal in output connection 3 is applied to a resistance-capacitance coupling circuit having a long time-constant, this circuit being constituted by a capacitor 5 and a resistor 6. For example, the values of capacitor 5 and resistor 6 may be 0.2 microfarad and 1 megohm, respectively, giving a time-constant large as compared to any of the times mentioned in Fig. 1, and specifically very large compared to the rise and decay times of the bandpass filter 1. The signal in the output connection 3 is applied through capacitor 5 to the grid 7 of vacuum triode 8 connected as an amplifier. The output of amplifier tube 8 is applied from the anode 9 thereof to a detector 10 the output of which, in turn, operates a relay 11 to provide keyed output at its output terminals.

Curves B and C in Fig. 1 are representative of the modulated tone (Fig. 2) after detection in detector 10, and are used to illustrate the action of a receiver with and without the present invention. For the receiver to function properly, the keyed output pulses in the output of relay 11 must be of the same length as the (minimum) "mark" signal A, and should be independent of the level of the output of bandpass filter 1.

It is well known that in a bandpass filter such as filter 1, the rise time is equal to the decay time, for rectangular or other steep input pulses such as signal A (Fig. 1). In this connection, the "rise time" is the time from the onset of the signal A to the point at which the filter output B or C reaches its maximum value, while the "decay time" is the time from the cessation of the signal A to the point at which the filter output B or C reaches a value of zero.

The operation of this invention will now be explained. It is assumed, first, that the rectangular wave signal envelope A is applied to the input of filter 1 and that the higher signal level (curve B) is applicable. The invention will operate, however, even if the input signal to filter 1 is not rectangular in form. The output of amplifier 2 is such that at point D in Fig. 1 grid current starts to flow in tube 8, and the output from detector 10 is sufficient to operate the output relay 11. Capacitor 5 will then begin to charge, as a result of the flow of grid current in tube 8. This capacitor will charge at a rate depending on the rise time of filter 1, because the grid-to-cathode resistance when tube 8 is drawing grid current is low compared to the resistance of resistor 6.

The capacitor 5 being negatively charged, beginning with the peak M of the filter output pulse B this capacitor will maintain a negative potential on the grid 7 of tube 8, reducing its gain. This reduced gain means that a higher signal level at the output of amplifier 2 is now necessary to maintain relay 11 operated or energized, so that the relay 11 will now be deenergized at a higher signal level than that at which it was energized. Thus, when the output of amplifier 2 drops to point N in Fig. 1, the output relay 11 is deenergized. The output pulse is then represented by the dashed lines E—D—P—Q and the output pulse is the same width as the input pulse A because the portion of the rise time from O to D is the same as the portion of the decay time from M to N. The input and output pulses being of the same width, distortion is eliminated.

Considering now what occurs when the input signal level drops to a value such that amplifier output signal curve C is applicable, the output relay 11 will operate at point K. Capacitor 5 will begin to charge at point K, but will not charge to as high a potential as before because peak R is lower than peak M. The gain of tube 8 is therefore reduced but not as much as before, meaning that relay 11 will be deenergized at a signal level S lower than N but higher than that at which it was energized, giving an output pulse represented by the dashed lines H—K—T—U. That portion of the rise time from O to K is longer than the time from O to D, but the decay time interval from R to S is also longer than the interval from M to N, so the output pulse H—K—T—U is still the same width as the input pulse A.

Thus, according to this invention distortion is substantially completely eliminated and the receiver operation is highly satisfactory despite variations in the receiver input signal, the output pulses being the same width for both signal levels B and C both being the same width as the input pulse A. At the same time, only narrow bandpass filters are required, thus enabling more efficient utilization of the allotted frequency spectrum by allowing more tone channels to be used therein without interaction.

The time-constant of the capacitor 5 and resistor 6 must be very long, in order for the negative charge to remain on capacitor 5 from M to N or from R to S, to reduce the gain of tube 8 as desired. Since this time-constant is so long, capacitor 5 would tend to maintain a high negative potential on grid 7 in the intervals between pulses and the desired operation on succeeding pulses would not be obtained. Therefore, the capacitor 5 must be discharged in the intervals between pulses. This operation is accomplished by a detector 12 and a diode 13, coupled between the amplifier output connection 4 and grid 7. The diode 13 has its anode connected to the output of detector 12 and its cathode connected to, grid 7, or to the grid side of capacitor 5.

The signal level in connection 4 is greater, for example 12 db greater, than that in connection 3, so that the signal level to detector 12 is 12 db greater than the level to capacitor 5. During a signal pulse, which is detected by detector 12 to produce a negative voltage at the output of such detector, the anode of diode 13 is biased negatively so no current flows in this diode. Capacitor 5 cannot discharge through diode 13 during negative half-cycles of the incoming signal (tone) because detector 12 provides a higher negative voltage on the anode of diode 13 than that provided on the cathode of this diode by way of capacitor 5. The signal level to detector 12 is higher than that to capacitor 5, to insure that the anode of diode 13 is always more negative than the cathode of this diode during the signal periods, when the tone is on. Thus, during a received signal pulse such as B or C, the detector 12 and diode 13 do not in any way interfere with the proper operation of the long time-constant circuit 5, 6 to produce the desirable results previously described.

When the received signal pulse B or C decays to a certain value, the negative bias on the anode of diode 13 disappears, resulting in current flow through this diode. The capacitor 5 is then discharged rapidly because the current path through the diode has much lower resistance than does resistor 6. The circuit is then in proper condition for the next succeeding pulse, with the capacitor 5 discharged and ready to be charged again during the rise time of the signal pulse in the output of amplifier 2, as previously described.

Fig. 4 is a detailed circuit diagram of an arrangement according to this invention. In this figure, elements the same as those of Fig. 3 are denoted by the same reference numerals. The multiplex keyed tone signal is applied to the input of bandpass filter 1 (which has a bandwidth of 75 cycles, for example), and the output of this filter is applied to the primary winding of a transformer 14. The secondary winding of transformer 14 is coupled by way of a potentiometer 15 to the grid 16 of a vacuum tube 17 which constitutes the first stage of a two-stage amplifier 2. The anode 18 of the second vacuum tube 19 is the output electrode of amplifier 2, and amplifier output connection 4 is coupled directly to this anode. In order to provide a decreased signal level in amplifier output connection 3, two resistors 20 and 21 are connected in series between the positive terminal of the unidirectional anode potential source and anode 18 to constitute a voltage divider, with connection 3 coupled to the common junction of resistors 20 and 21.

The amplifier output connection 3 extends to the capacitor 5 of the long time-constant RC circuit 5, 6 and thence to the grid 7 of the controlled gain amplifier tube 8. The anode or output electrode 9 of tube 8 is connected through a coupling capacitor 22 to a potentiometer 23 the movable arm of which is connected to the anode of a diode 10 connected to act as a detector. The detector output appears across a load resistor 24 which is connected between the cathode of diode 10 and ground, and this output is applied between the grid 25 and the cathode 26 of a triode relay tube 27 having the winding 28 of a relay 29 connected in its anode circuit. The cathode 26 is biased so that the tube 27 is cut off, by connecting this cathode to a positive potential point on a voltage divider consisting of two resistors 30 and 31 connected between the positive anode potential terminal and ground. The detected signal appearing across resistor 24 is of such polarity as to cause triode 27 to conduct, thereby operating or energizing the relay 29 to provide keyed output in the relay output connections 32.

The amplifier output connection 4 extends by way of a coupling capacitor 33 to the cathode of a diode detector 12 having a load resistor 34 connected between the anode of diode 12 and ground. The anode of diode 13 is connected directly to the upper or ungrounded end of resistor 34 and directly to the anode of detector 12, while the cathode of diode 13 is connected directly to control grid 7 or the grid side of capacitor 5. As previously stated, the combination of detector 12 and diode 13 operates to discharge the capacitor 5 between signal pulses.

The system of the invention may be used in various kinds of frequency division multiplex systems and, although not limited thereto, is especially useful in relay systems such as microwave relay systems.

What is claimed is:

1. In a translating circuit for wave pulses having short rise and fall times, a narrow bandpass filter having rise and decay times which are long compared to the rise and fall times of said pulses and which therefore produces distortion in wave pulses applied to the input thereof, means for applying said pulses to the input of said filter, an amplifier tube having at least an anode, a cathode, and a grid, a resistance-capacitance coupling between the output of said filter and said grid, said coupling having a time-constant which is long compared to the decay time of said filter, said tube being biased to draw grid current during the rise time of the pulse voltage wave in the output of said filter, a diode having one electrode connected to said capacitance to provide a fast discharge circuit therefor, means responsive to the output of said filter for biasing said diode to conduct only between pulses appearing in the output of said filter, and a signal utilization circuit coupled to said anode.

2. In a translating circuit for wave pulses having short rise and fall times, a narrow bandpass filter having rise and decay times which are long compared to the rise and fall times of said pulses and which therefore produces distortion in wave pulses applied to the input thereof, means for applying said pulses to the input of said filter, an amplifier tube having at least an anode, a cathode, and a grid, a resistance-capacitance coupling between the output of said filter and said grid, said coupling having a time-constant which is long compared to the decay time of said filter, said tube being biased to draw grid current during the rise time of the pulse voltage wave in the output of said filter, a diode having one electrode connected to said capacitance to provide a fast discharge circuit therefor, a detector having its output coupled to one electrode of said diode to provide biasing means therefor, means coupling the input of said detector to the output of said filter, and a signal utilization circuit coupled to said anode.

References Cited in the file of this patent

UNITED STATES PATENTS

| | | |
|---|---|---|
| 1,908,381 | Travis | May 9, 1933 |
| 2,086,465 | Brown | July 6, 1937 |
| 2,287,926 | Zepler | June 30, 1942 |
| 2,299,391 | Holmes | Oct. 20, 1942 |
| 2,480,171 | White | Aug. 30, 1949 |
| 2,503,835 | Montgomery | Apr. 11, 1950 |
| 2,552,232 | Sunstein | May 8, 1951 |
| 2,629,049 | Miller et al. | Feb. 17, 1953 |